B. G. LAMME.
DYNAMO ELECTRIC MACHINE.
APPLICATION FILED SEPT. 10, 1909.

1,138,672.

Patented May 11, 1915.
2 SHEETS—SHEET 1.

WITNESSES:
Fred H. Miller

INVENTOR
Benjamin G. Lamme
BY
Wesley G. Carr
ATTORNEY.

B. G. LAMME.
DYNAMO ELECTRIC MACHINE.
APPLICATION FILED SEPT. 10, 1909.

1,138,672.

Patented May 11, 1915.
2 SHEETS—SHEET 2.

WITNESSES:
Fred H. Miller
R. J. Barbour

INVENTOR
Benjamin G. Lamme
BY
Kerby S. Carr
ATTORNEY

UNITED STATES PATENT OFFICE.

BENJAMIN G. LAMME, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,138,672.  Specification of Letters Patent.  Patented May 11, 1915.

Application filed September 10, 1909. Serial No. 517,108.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Dynamo-Electric Machines, of which the following is a specification.

My invention relates to dynamo-electric machines and particularly to such machines as have field magnets provided with commutating poles and distributed commutating windings.

The object of my invention is to provide a field magnet structure for dynamo-electric machines of the character above indicated, the core laminæ of which shall be so formed and assembled as to afford compactness and simplicity of arrangement of parts and ease of assembling and one which shall insure such a relative disposition of coils and core parts as will permit of ready removal of such elements or parts as may be desired for purposes of replacement or repair.

Figure 1:
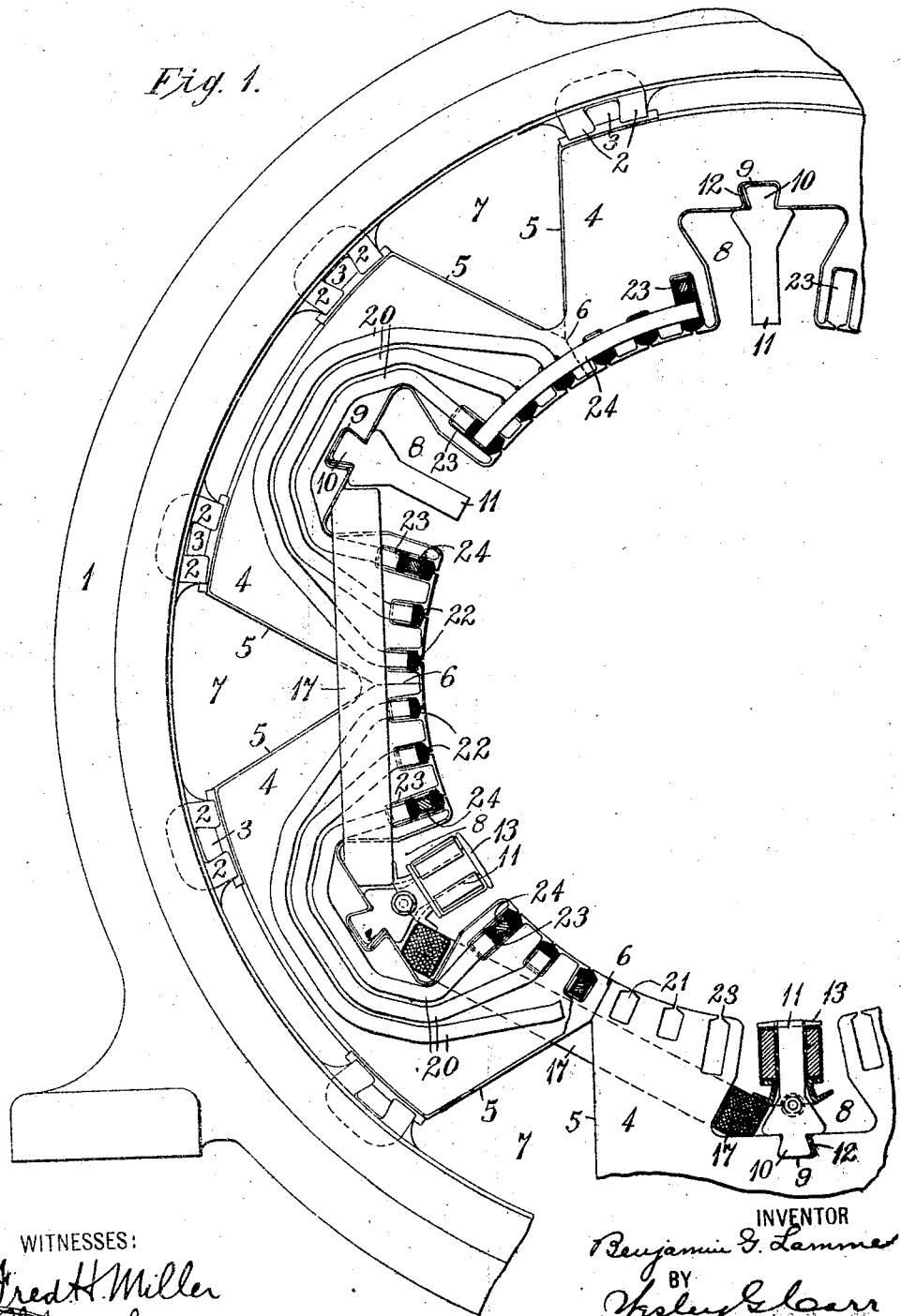
Figure 3:
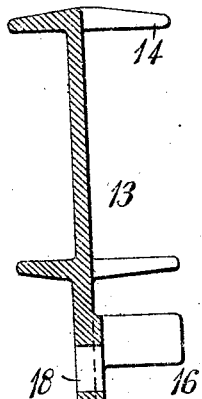
Figure 4:
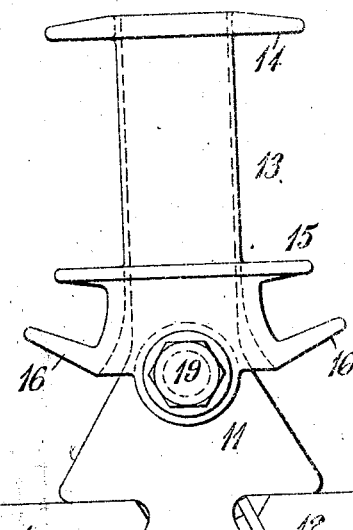
Figure 5:
Figure 2:
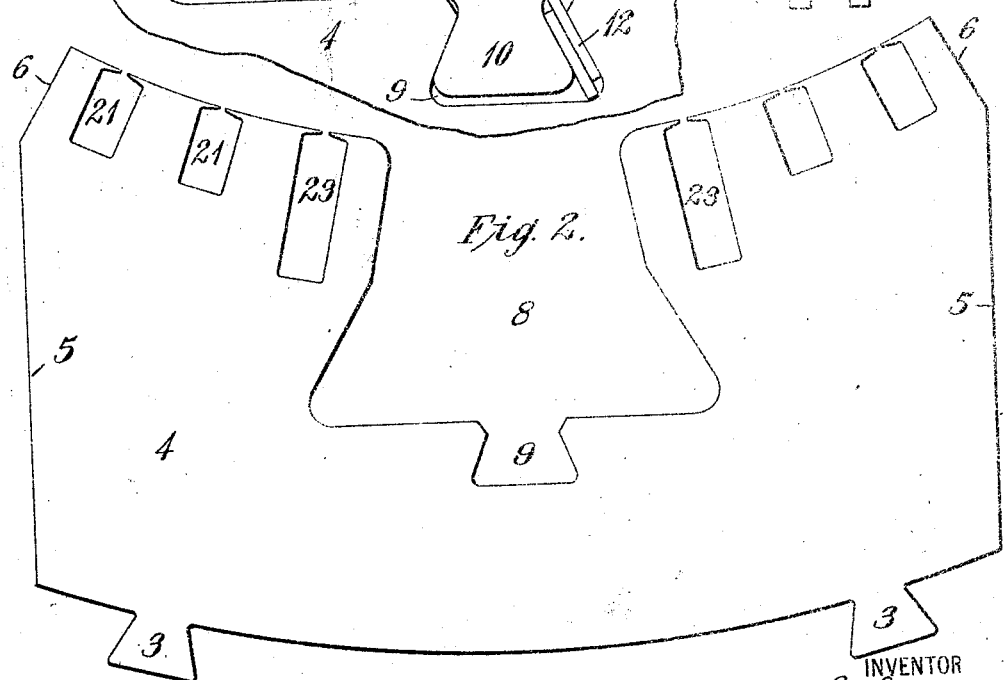

In the accompanying drawings, Figure 1 is an end elevation of a portion of a field magnet of a dynamo-electric machine constructed in accordance with my invention. Fig. 2 is a side view of one of the segments of the core laminæ shown in Fig. 1. Fig. 3 is a longitudinal sectional view of a bracket or hanger for one of the commutating coils. Fig. 4 is a side elevation of one of the commutating poles, its coil support and a portion of the main core segment by which the same are supported. Fig. 5 is a view of a coil for one of the commutating poles.

It has become a more or less common practice to provide both shunt and series direct current motors with auxiliary poles, intermediate the main field magnet poles, and to provide such poles with auxiliary windings in order to improve the commutation of the currents supplied to the motors under certain operating conditions. It has also been the practice, in some cases, to provide direct current generators, which are operated at high speeds, as, for example, by steam turbines, with commutating poles which are utilized in substantially the same manner and for the same purpose as those employed in connection with motors. It has also been more or less common practice, in connection with both motors and generators, to provide the field magnets with distributed windings disposed in slots in, or adjacent to, the faces of the pole pieces, in order to compensate for the armature reaction in such machines, and my present invention contemplates the employment of both the commutating poles and the compensating windings above mentioned in connection with high speed generators, though I do not intend or desire to limit the use of my invention to this particular type or kind of machine, since it may be utilized in connection with any machine, either generator or motor, to which it may be structurally and electrically adapted.

The structural details of my invention, which may, of course, be varied or modified to such an extent as may be desired within the limits imposed by the state of the art will now be set forth with reference to the different figures of the drawings.

The field magnet frame 1, which may be a casing of any suitable form and dimensions, is provided on its interior with a series of pairs of inwardly projecting lugs 2 between which are slots or grooves of dove-tail shape to receive dove-tail lugs or projections 3 with which the segmental core plates 4 are provided. Each segmental core plate 4 has substantially parallel side edges 5 except for short distances adjacent to its inner ends, where the edges 6 are radial, the dimensions being such that, when the plates are in position, as indicated in Fig. 1, the short portions 6 of the side edges of adjacent plates will be in close contact and the triangular spaces 7 between the main portions 5 of the side edges will provide ample space for the circulation of cooling currents of air. Each segmental core plate is provided with a central recess 8 of considerable size, which extends rearwardly from its forward end and the rear wall of the recess is substantially perpendicular to the edges 5 of the plates. A recess 9 of dove-tail shape is provided at the rear of each recess 8 in which is seated a dove-tail projection 10 on the rear end of an auxiliary pole piece 11. The pole pieces 11 are held securely in position by means of keys 12 which are driven in between the one side of the dove-tail projection 10 and the corresponding side of the recess 9 in which the projection is located. Mounted upon opposite sides of each auxiliary pole piece, are hangers or supporters 13, each of which is provided with end flanges 14 and similar flanges 15 near the base portion, the auxiliary coil being mounted upon the support or hanger between the said flanges. The rear end of the hanger 13 is provided with beveled flanges 16 which are utilized to support the shunt coils 17 of the machine and are also provided with holes 18 to receive bolts 19 to fasten the hangers in position.

Each set of superposed plate segments 4 constitutes one-half of each of the two pole pieces of the machine, the shunt coil for each pole piece being disposed around these two portions and having its sides located in the recesses 8 and supported by the beveled flanges 16 of the hangers 13, as indicated in Fig. 1.

The compensating windings 20 are disposed in partially closed slots 21 and 23 in the faces of the main pole pieces and are fastened and insulated therein by suitable wedges 22 of insulating material. The end portions of the compensating coils are bent into approximately U-shape substantially parallel to the end of the core and around the recesses 8 in which are commutating poles and the sides of the shunt coils are located. The outside slots 23 in each main pole piece are made substantially twice the depth of the slots 21 in order to receive the series coils 24 of the machine, as well as the compensating coils which pertain to these slots.

It will be understood from the illustration and foregoing description that the various core parts and coils are so formed and assembled that a desirable economy of material and space are secured and ventilation of the parts insured. It will also be understood that ready removal of any of the parts may be effected for the purpose of replacement or repair without disturbing any considerable number of the parts the removal of which is not desired.

I claim as my invention:

1. A field magnet for a dynamo-electric machine having a laminated core comprising a plurality of sets of superposed plates each of which constitutes parts of two adjacent main pole pieces and is provided with a central recess and pole face slots, auxiliary pole pieces supported in said recesses, commutating coils for said auxiliary pole pieces, main magnetizing coils surrounding the main pole pieces and compensating coils disposed in said slots.

2. A field magnet for a dynamo-electric machine having a plurality of sets of superposed core plates each of which constitutes parts of two adjacent main pole pieces and is provided with a central recess, main coils surrounding said pole pieces, auxiliary pole pieces seated in said recesses, coils for said auxiliary pole pieces, and hangers for said coils having flanges for supporting the main coils.

3. A field magnet for a dynamo-electric machine having a cylindrical frame and a continuous cylindrical laminated core comprising a plurality of sets of superposed plates having substantially parallel side edges except adjacent to their inner ends where adjacent sets are in abutting engagement along radial planes to form a continuous pole face, each of said sets of plates constituting parts of two adjacent main pole pieces, whereby openings are provided between the cylindrical frame and portions of said core.

4. A field magnet for a dynamo-electric machine having a core composed of segmental laminæ, auxiliary pole pieces supported by said segmental laminæ, main coils, auxiliary coils, and hanger brackets mounted on the auxiliary pole pieces and having flanges for supporting both the main coils and the auxiliary coils.

5. A field magnet for a dynamo-electric machine having a laminated core provided with slots in its pole piece faces, compensating coils in all of said slots and series magnetizing coils in the slots which are adjacent to the sides of the pole pieces.

6. In a field magnet for dynamo-electric machines, a core having pole pieces provided with deep face slots adjacent to their sides and relatively shallow intermediate face slots, main magnetizing coils surrounding said pole pieces, compensating coils in all of the face slots and series magnetizing coils in the deep face slots.

7. In a field magnet for dynamo-electric machines, a segmental laminated core having face slots in its main pole pieces and commutating pole pieces between the main pole pieces, main magnetizing coils surrounding said pole pieces, compensating coils in the main pole piece slots, and series magnetizing coils in certain of the pole piece slots.

8. In a dynamo-electric machine, a field magnet having a laminated core each of the main pole pieces of which is provided with two sets of face slots of unequal depth, compensating coils in all of said face slots, and series magnetizing coils in the deeper face slots.

9. In a field magnet for dynamo-electric machines, the combination with a core provided with a plurality of main pole pieces having face slots therein, and main magnetizing coils surrounding said pole pieces, of compensating coils disposed in said slots and a second magnetizing coil disposed in the outer face slots concentric with said pole pieces.

10. In a field magnet for dynamo-electric machines, the combination with a core provided with a plurality of main pole pieces having face slots therein and main magnetizing coils surrounding said pole pieces, of series magnetizing coils disposed in said slots in concentric relation to said pole pieces.

11. In a field magnet for dynamo-electric machines, the combination with a core provided with a plurality of main pole pieces having deep face slots adjacent to their sides and relatively shallow intermediate slots, of one set of coils in said shallow slots and a second set of coils in said deep slots and in concentric relation to said pole pieces.

In testimony whereof, I have hereunto subscribed my name this 30th day of Aug., 1909.

BENJ. G. LAMME.

Witnesses:
E. LIVINGSTONE,
B. B. HINES.